(12) United States Patent
Mamiya et al.

(10) Patent No.: US 9,417,053 B2
(45) Date of Patent: Aug. 16, 2016

(54) THREE-DIMENSIONAL MEASURING DEVICE

(71) Applicant: CKD Corporation, Aichi (JP)

(72) Inventors: Takahiro Mamiya, Aichi (JP); Hiroyuki Ishigaki, Aichi (JP)

(73) Assignee: CKD Corporation, Aichi (JP)

( * ) Notice: Subject to any disclaimer, the term of this patent is extended or adjusted under 35 U.S.C. 154(b) by 151 days.

(21) Appl. No.: 14/444,564

(22) Filed: Jul. 28, 2014

(65) Prior Publication Data

US 2014/0333727 A1 Nov. 13, 2014

Related U.S. Application Data

(63) Continuation of application No. PCT/JP2012/061063, filed on Apr. 25, 2012.

(30) Foreign Application Priority Data

Jan. 27, 2012 (JP) ................................. 2012-014793

(51) Int. Cl.
*G06T 7/00* (2006.01)
*G01B 11/02* (2006.01)
*G01B 11/25* (2006.01)

(52) U.S. Cl.
CPC .......... *G01B 11/022* (2013.01); *G01B 11/2531* (2013.01); *G06T 7/0008* (2013.01); *G06T 2207/10012* (2013.01); *G06T 2207/10152* (2013.01); *G06T 2207/30141* (2013.01); *G06T 2207/30152* (2013.01)

(58) Field of Classification Search
CPC ............. G01B 11/022; G01B 11/2531; G06T 2207/10012; G06T 2207/10152; G06T 2207/30141; G06T 2207/30152; G06T 7/0008
See application file for complete search history.

(56) References Cited

U.S. PATENT DOCUMENTS

2010/0183194 A1* 7/2010 Umemura .......... G01B 11/0608
382/103
2010/0302364 A1* 12/2010 Kim .................... G01B 11/2531
348/136

FOREIGN PATENT DOCUMENTS

| JP | 2002-107125 | A | 4/2002 | |
| JP | 2003-254727 | A | 9/2003 | |
| JP | 2003254727 | * | 9/2003 | ........... G01B 11/022 |
| JP | 2005-214653 | A | 8/2005 | |
| JP | 2006-300539 | A | 11/2006 | |
| JP | 2011-220934 | A | 11/2011 | |

OTHER PUBLICATIONS

International Search Report for PCT/JP2012/061063, mailed May 22, 2012 (2 pages).

* cited by examiner

*Primary Examiner* — Mohammed Rahaman
(74) *Attorney, Agent, or Firm* — Osha Liang LLP

(57) ABSTRACT

A three-dimensional measuring device includes an extraction unit that extracts an image data set with a brightness value of each of pixels in image data within an effective range from among a plurality of image data sets at each of coordinate positions of an object to be measured, and a three-dimensional measurement unit that performs three-dimensional measurement relating to each of the coordinate positions of the object to be measured based on the extracted image data set. The extraction unit extracts the image data set imaged under a pattern light with the highest irradiation brightness among a plurality of types of pattern lights when there is a plurality of sets of the image data sets with the brightness value of each of the pixels in the image data within the effective range from among the plurality of the image data sets.

11 Claims, 11 Drawing Sheets

FIG. 5A

| Time ↓ | Type of irradiation light | | | | | | | |
|---|---|---|---|---|---|---|---|---|
| t1 | First pattern light of first brightness | Coordinate | P17 | P16 | P15 | P14 | P13 | P12 | G1 |
| | | Band phase | 0° | 22.5° | 45° | 67.5° | 90° | 112.5° | |
| t2 | First pattern light of second brightness | Coordinate | P18 | P17 | P16 | P15 | P14 | P13 | G2 |
| | | Band phase | 0° | 22.5° | 45° | 67.5° | 90° | 112.5° | |
| t3 | First pattern light of third brightness | Coordinate | P19 | P18 | P17 | P16 | P15 | P14 | G3 |
| | | Band phase | 0° | 22.5° | 45° | 67.5° | 90° | 112.5° | |
| t4 | First pattern light of fourth brightness | Coordinate | P20 | P19 | P18 | P17 | P16 | P15 | G4 |
| | | Band phase | 0° | 22.5° | 45° | 67.5° | 90° | 112.5° | |
| t5 | Second pattern light of first brightness | Coordinate | P21 | P20 | P19 | P18 | P17 | P16 | G5 |
| | | Band phase | 0° | 22.5° | 45° | 67.5° | 90° | 112.5° | |
| t6 | Second pattern light of second brightness | Coordinate | P22 | P21 | P20 | P19 | P18 | P17 | G6 |
| | | Band phase | 0° | 22.5° | 45° | 67.5° | 90° | 112.5° | |
| t7 | Second pattern light of third brightness | Coordinate | P23 | P22 | P21 | P20 | P19 | P18 | G7 |
| | | Band phase | 0° | 22.5° | 45° | 67.5° | 90° | 112.5° | |
| t8 | Second pattern light of fourth brightness | Coordinate | P24 | P23 | P22 | P21 | P20 | P19 | G8 |
| | | Band phase | 0° | 22.5° | 45° | 67.5° | 90° | 112.5° | |
| t9 | Third pattern light of first brightness | Coordinate | P25 | P24 | P23 | P22 | P21 | P20 | G9 |
| | | Band phase | 0° | 22.5° | 45° | 67.5° | 90° | 112.5° | |
| t10 | Third pattern light of second brightness | Coordinate | P26 | P25 | P24 | P23 | P22 | P21 | G10 |
| | | Band phase | 0° | 22.5° | 45° | 67.5° | 90° | 112.5° | |
| t11 | Third pattern light of third brightness | Coordinate | P27 | P26 | P25 | P24 | P23 | P22 | G11 |
| | | Band phase | 0° | 22.5° | 45° | 67.5° | 90° | 112.5° | |
| t12 | Third pattern light of fourth brightness | Coordinate | P28 | P27 | P26 | P25 | P24 | P23 | G12 |
| | | Band phase | 0° | 22.5° | 45° | 67.5° | 90° | 112.5° | |
| t13 | Fourth pattern light of first brightness | Coordinate | P29 | P28 | P27 | P26 | P25 | P24 | G13 |
| | | Band phase | 0° | 22.5° | 45° | 67.5° | 90° | 112.5° | |
| t14 | Fourth pattern light of second brightness | Coordinate | P30 | P29 | P28 | P27 | P26 | P25 | G14 |
| | | Band phase | 0° | 22.5° | 45° | 67.5° | 90° | 112.5° | |
| t15 | Fourth pattern light of third brightness | Coordinate | P31 | P30 | P29 | P28 | P27 | P26 | G15 |
| | | Band phase | 0° | 22.5° | 45° | 67.5° | 90° | 112.5° | |
| t16 | Fourth pattern light of fourth brightness | Coordinate | P32 | P31 | P30 | P29 | P28 | P27 | G16 |
| | | Band phase | 0° | 22.5° | 45° | 67.5° | 90° | 112.5° | |

FIG. 5B

| Time ↓ | | Type of irradiation light | | | | | | | |
|---|---|---|---|---|---|---|---|---|---|
| | t1 | First pattern light of first brightness | Coordinate | P11 | P10 | P9 | P8 | P7 | P6 | G1 |
| | | | Band phase | 135° | 157.5° | 180° | 202.5° | 225° | 247.5° | |
| | t2 | First pattern light of second brightness | Coordinate | P12 | P11 | P10 | P9 | P8 | P7 | G2 |
| | | | Band phase | 135° | 157.5° | 180° | 202.5° | 225° | 247.5° | |
| | t3 | First pattern light of third brightness | Coordinate | P13 | P12 | P11 | P10 | P9 | P8 | G3 |
| | | | Band phase | 135° | 157.5° | 180° | 202.5° | 225° | 247.5° | |
| | t4 | First pattern light of fourth brightness | Coordinate | P14 | P13 | P12 | P11 | P10 | P9 | G4 |
| | | | Band phase | 135° | 157.5° | 180° | 202.5° | 225° | 247.5° | |
| | t5 | Second pattern light of first brightness | Coordinate | P15 | P14 | P13 | P12 | P11 | P10 | G5 |
| | | | Band phase | 135° | 157.5° | 180° | 202.5° | 225° | 247.5° | |
| | t6 | Second pattern light of second brightness | Coordinate | P16 | P15 | P14 | P13 | P12 | P11 | G6 |
| | | | Band phase | 135° | 157.5° | 180° | 202.5° | 225° | 247.5° | |
| | t7 | Second pattern light of third brightness | Coordinate | P17 | P16 | P15 | P14 | P13 | P12 | G7 |
| | | | Band phase | 135° | 157.5° | 180° | 202.5° | 225° | 247.5° | |
| | t8 | Second pattern light of fourth brightness | Coordinate | P18 | P17 | P16 | P15 | P14 | P13 | G8 |
| | | | Band phase | 135° | 157.5° | 180° | 202.5° | 225° | 247.5° | |
| | t9 | Third pattern light of first brightness | Coordinate | P19 | P18 | P17 | P16 | P15 | P14 | G9 |
| | | | Band phase | 135° | 157.5° | 180° | 202.5° | 225° | 247.5° | |
| | t10 | Third pattern light of second brightness | Coordinate | P20 | P19 | P18 | P17 | P16 | P15 | G10 |
| | | | Band phase | 135° | 157.5° | 180° | 202.5° | 225° | 247.5° | |
| | t11 | Third pattern light of third brightness | Coordinate | P21 | P20 | P19 | P18 | P17 | P16 | G11 |
| | | | Band phase | 135° | 157.5° | 180° | 202.5° | 225° | 247.5° | |
| | t12 | Third pattern light of fourth brightness | Coordinate | P22 | P21 | P20 | P19 | P18 | P17 | G12 |
| | | | Band phase | 135° | 157.5° | 180° | 202.5° | 225° | 247.5° | |
| | t13 | Fourth pattern light of first brightness | Coordinate | P23 | P22 | P21 | P20 | P19 | P18 | G13 |
| | | | Band phase | 135° | 157.5° | 180° | 202.5° | 225° | 247.5° | |
| | t14 | Fourth pattern light of second brightness | Coordinate | P24 | P23 | P22 | P21 | P20 | P19 | G14 |
| | | | Band phase | 135° | 157.5° | 180° | 202.5° | 225° | 247.5° | |
| | t15 | Fourth pattern light of third brightness | Coordinate | P25 | P24 | P23 | P22 | P21 | P20 | G15 |
| | | | Band phase | 135° | 157.5° | 180° | 202.5° | 225° | 247.5° | |
| | t16 | Fourth pattern light of fourth brightness | Coordinate | P26 | P25 | P24 | P23 | P22 | P21 | G16 |
| | | | Band phase | 135° | 157.5° | 180° | 202.5° | 225° | 247.5° | |

FIG. 5C

| Time ↓ | | Type of irradiation light | | | | | | | |
|---|---|---|---|---|---|---|---|---|---|
| t1 | First pattern light of first brightness | Coordinate | P5 | P4 | P3 | P2 | P1 | G1 |
| | | Band phase | 270° | 292.5° | 315° | 337.5° | 360° | |
| t2 | First pattern light of second brightness | Coordinate | P6 | P5 | P4 | P3 | P2 | G2 |
| | | Band phase | 270° | 292.5° | 315° | 337.5° | 360° | |
| t3 | First pattern light of third brightness | Coordinate | P7 | P6 | P5 | P4 | P3 | G3 |
| | | Band phase | 270° | 292.5° | 315° | 337.5° | 360° | |
| t4 | First pattern light of fourth brightness | Coordinate | P8 | P7 | P6 | P5 | P4 | G4 |
| | | Band phase | 270° | 292.5° | 315° | 337.5° | 360° | |
| t5 | Second pattern light of first brightness | Coordinate | P9 | P8 | P7 | P6 | P5 | G5 |
| | | Band phase | 270° | 292.5° | 315° | 337.5° | 360° | |
| t6 | Second pattern light of second brightness | Coordinate | P10 | P9 | P8 | P7 | P6 | G6 |
| | | Band phase | 270° | 292.5° | 315° | 337.5° | 360° | |
| t7 | Second pattern light of third brightness | Coordinate | P11 | P10 | P9 | P8 | P7 | G7 |
| | | Band phase | 270° | 292.5° | 315° | 337.5° | 360° | |
| t8 | Second pattern light of fourth brightness | Coordinate | P12 | P11 | P10 | P9 | P8 | G8 |
| | | Band phase | 270° | 292.5° | 315° | 337.5° | 360° | |
| t9 | Third pattern light of first brightness | Coordinate | P13 | P12 | P11 | P10 | P9 | G9 |
| | | Band phase | 270° | 292.5° | 315° | 337.5° | 360° | |
| t10 | Third pattern light of second brightness | Coordinate | P14 | P13 | P12 | P11 | P10 | G10 |
| | | Band phase | 270° | 292.5° | 315° | 337.5° | 360° | |
| t11 | Third pattern light of third brightness | Coordinate | P15 | P14 | P13 | P12 | P11 | G11 |
| | | Band phase | 270° | 292.5° | 315° | 337.5° | 360° | |
| t12 | Third pattern light of fourth brightness | Coordinate | P16 | P15 | P14 | P13 | P12 | G12 |
| | | Band phase | 270° | 292.5° | 315° | 337.5° | 360° | |
| t13 | Fourth pattern light of first brightness | Coordinate | P17 | P16 | P15 | P14 | P13 | G13 |
| | | Band phase | 270° | 292.5° | 315° | 337.5° | 360° | |
| t14 | Fourth pattern light of second brightness | Coordinate | P18 | P17 | P16 | P15 | P14 | G14 |
| | | Band phase | 270° | 292.5° | 315° | 337.5° | 360° | |
| t15 | Fourth pattern light of third brightness | Coordinate | P19 | P18 | P17 | P16 | P15 | G15 |
| | | Band phase | 270° | 292.5° | 315° | 337.5° | 360° | |
| t16 | Fourth pattern light of fourth brightness | Coordinate | P20 | P19 | P18 | P17 | P16 | G16 |
| | | Band phase | 270° | 292.5° | 315° | 337.5° | 360° | |

FIG. 6A

| | | G1 | G2 | G3 | G4 | G5 | G6 | G7 | G8 | G9 | G10 | G11 | G12 | G13 | G14 | G15 | G16 |
|---|---|---|---|---|---|---|---|---|---|---|---|---|---|---|---|---|---|
| First pattern light of first brightness | Coordinate | P17 | P17 | P17 | P17 | P17 | P17 | P17 | P17 | P17 | P17 | P17 | P17 | P17 | P17 | P17 | P17 |
| | Band phase | 0° | 22.5° | 45° | 67.5° | 90° | 112.5° | 135° | 157.5° | 180° | 202.5° | 225° | 247.5° | 270° | 292.5° | 315° | 337.5° |
| First pattern light of second brightness | Coordinate | | P18 | P18 | P18 | P18 | P18 | P18 | P18 | P18 | P18 | P18 | P18 | P18 | P18 | P18 | P18 |
| | Band phase | | 0° | 22.5° | 45° | 67.5° | 90° | 112.5° | 135° | 157.5° | 180° | 202.5° | 225° | 247.5° | 270° | 292.5° | 315° |
| First pattern light of third brightness | Coordinate | | | P19 | P19 | P19 | P19 | P19 | P19 | P19 | P19 | P19 | P19 | P19 | P19 | P19 | P19 |
| | Band phase | | | 0° | 22.5° | 45° | 67.5° | 90° | 112.5° | 135° | 157.5° | 180° | 202.5° | 225° | 247.5° | 270° | 292.5° |
| First pattern light of fourth brightness | Coordinate | | | | P20 | P20 | P20 | P20 | P20 | P20 | P20 | P20 | P20 | P20 | P20 | P20 | P20 |
| | Band phase | | | | 0° | 22.5° | 45° | 67.5° | 90° | 112.5° | 135° | 157.5° | 180° | 202.5° | 225° | 247.5° | 270° |
| Second pattern light of first brightness | Coordinate | | | | | P21 | P21 | P21 | P21 | P21 | P21 | P21 | P21 | P21 | P21 | P21 | P21 |
| | Band phase | | | | | 0° | 22.5° | 45° | 67.5° | 90° | 112.5° | 135° | 157.5° | 180° | 202.5° | 225° | 247.5° |
| Second pattern light of second brightness | Coordinate | | | | | | P22 | P22 | P22 | P22 | P22 | P22 | P22 | P22 | P22 | P22 | P22 |
| | Band phase | | | | | | 0° | 22.5° | 45° | 67.5° | 90° | 112.5° | 135° | 157.5° | 180° | 202.5° | 225° |
| Second pattern light of third brightness | Coordinate | | | | | | | P23 | P23 | P23 | P23 | P23 | P23 | P23 | P23 | P23 | P23 |
| | Band phase | | | | | | | 0° | 22.5° | 45° | 67.5° | 90° | 112.5° | 135° | 157.5° | 180° | 202.5° |
| Second pattern light of fourth brightness | Coordinate | | | | | | | | P24 | P24 | P24 | P24 | P24 | P24 | P24 | P24 | P24 |
| | Band phase | | | | | | | | 0° | 22.5° | 45° | 67.5° | 90° | 112.5° | 135° | 157.5° | 180° |
| Third pattern light of first brightness | Coordinate | | | | | | | | | P25 | P25 | P25 | P25 | P25 | P25 | P25 | P25 |
| | Band phase | | | | | | | | | 0° | 22.5° | 45° | 67.5° | 90° | 112.5° | 135° | 157.5° |
| Third pattern light of second brightness | Coordinate | | | | | | | | | | P26 | P26 | P26 | P26 | P26 | P26 | P26 |
| | Band phase | | | | | | | | | | 0° | 22.5° | 45° | 67.5° | 90° | 112.5° | 135° |
| Third pattern light of third brightness | Coordinate | | | | | | | | | | | P27 | P27 | P27 | P27 | P27 | P27 |
| | Band phase | | | | | | | | | | | 0° | 22.5° | 45° | 67.5° | 90° | 112.5° |
| Third pattern light of fourth brightness | Coordinate | | | | | | | | | | | | P28 | P28 | P28 | P28 | P28 |
| | Band phase | | | | | | | | | | | | 0° | 22.5° | 45° | 67.5° | 90° |
| Fourth pattern light of first brightness | Coordinate | | | | | | | | | | | | | P29 | P29 | P29 | P29 |
| | Band phase | | | | | | | | | | | | | 0° | 22.5° | 45° | 67.5° |
| Fourth pattern light of second brightness | Coordinate | | | | | | | | | | | | | | P30 | P30 | P30 |
| | Band phase | | | | | | | | | | | | | | 0° | 22.5° | 45° |
| Fourth pattern light of third brightness | Coordinate | | | | | | | | | | | | | | | P31 | P31 |
| | Band phase | | | | | | | | | | | | | | | 0° | 22.5° |
| Fourth pattern light of fourth brightness | Coordinate | | | | | | | | | | | | | | | | P32 |
| | Band phase | | | | | | | | | | | | | | | | 0° |

FIG. 6B

| | | P16 | P15 | P14 | P13 | P12 | P11 | P10 | P9 | P8 | P7 | P6 | P5 | P4 | P3 | P2 | P1 | |
|---|---|---|---|---|---|---|---|---|---|---|---|---|---|---|---|---|---|---|
| First pattern light of first brightness | Coordinate | P16 | P15 | P14 | P13 | P12 | P11 | P10 | P9 | P8 | P7 | P6 | P5 | P4 | P3 | P2 | P1 | G1 |
| | Band phase | 22.5° | 45° | 67.5° | 90° | 112.5° | 135° | 157.5° | 180° | 202.5° | 225° | 247.5° | 270° | 292.5° | 315° | 337.5° | 360° | |
| First pattern light of second brightness | Coordinate | P16 | P15 | P14 | P13 | P12 | P11 | P10 | P9 | P8 | P7 | P6 | P5 | P4 | P3 | P2 | | G2 |
| | Band phase | 45° | 67.5° | 90° | 112.5° | -35° | 157.5° | 180° | 202.5° | 225° | 247.5° | 270° | 292.5° | 315° | 337.5° | 360° | | |
| First pattern light of third brightness | Coordinate | P16 | P15 | P14 | P13 | P12 | P11 | P10 | P9 | P8 | P7 | P6 | P5 | P4 | P3 | | | G3 |
| | Band phase | 67.5° | 90° | 112.5° | 135° | 157.5° | 180° | 202.5° | 225° | 247.5° | 270° | 292.5° | 315° | 337.5° | 360° | | | |
| First pattern light of fourth brightness | Coordinate | P16 | P15 | P14 | P13 | P12 | P11 | P10 | P9 | P8 | P7 | P6 | P5 | P4 | | | | G4 |
| | Band phase | 90° | 112.5° | 135° | 157.5° | 180° | 202.5° | 225° | 247.5° | 270° | 292.5° | 315° | 337.5° | 360° | | | | |
| Second pattern light of first brightness | Coordinate | P16 | P15 | P14 | P13 | P12 | P11 | P10 | P9 | P8 | P7 | P6 | P5 | | | | | G5 |
| | Band phase | 112.5° | 135° | 157.5° | 180° | 202.5° | 225° | 247.5° | 270° | 292.5° | 315° | 337.5° | 360° | | | | | |
| Second pattern light of second brightness | Coordinate | P16 | P15 | P14 | P13 | P12 | P11 | P10 | P9 | P8 | P7 | P6 | | | | | | G6 |
| | Band phase | 135° | 157.5° | 180° | 202.5° | 225° | 247.5° | 270° | 292.5° | 315° | 337.5° | 360° | | | | | | |
| Second pattern light of third brightness | Coordinate | P16 | P15 | P14 | P13 | P12 | P11 | P10 | P9 | P8 | P7 | | | | | | | G7 |
| | Band phase | 157.5° | 180° | 202.5° | 225° | 247.5° | 270° | 292.5° | 315° | 337.5° | 360° | | | | | | | |
| Second pattern light of fourth brightness | Coordinate | P16 | P15 | P14 | P13 | P12 | P11 | P10 | P9 | P8 | | | | | | | | G8 |
| | Band phase | 180° | 202.5° | 225° | 247.5° | 270° | 292.5° | 315° | 337.5° | 360° | | | | | | | | |
| Third pattern light of first brightness | Coordinate | P16 | P15 | P14 | P13 | P12 | P11 | P10 | P9 | | | | | | | | | G9 |
| | Band phase | 202.5° | 225° | 247.5° | 270° | 292.5° | 315° | 337.5° | 360° | | | | | | | | | |
| Third pattern light of second brightness | Coordinate | P16 | P15 | P14 | P13 | P12 | P11 | P10 | | | | | | | | | | G10 |
| | Band phase | 225° | 247.5° | 270° | 292.5° | 315° | 337.5° | 360° | | | | | | | | | | |
| Third pattern light of third brightness | Coordinate | P16 | P15 | P14 | P13 | P12 | P11 | | | | | | | | | | | G11 |
| | Band phase | 247.5° | 270° | 292.5° | 315° | 337.5° | 360° | | | | | | | | | | | |
| Third pattern light of fourth brightness | Coordinate | P16 | P15 | P14 | P13 | P12 | | | | | | | | | | | | G12 |
| | Band phase | 270° | 292.5° | 315° | 337.5° | 330° | | | | | | | | | | | | |
| Fourth pattern light of first brightness | Coordinate | P16 | P15 | P14 | P13 | | | | | | | | | | | | | G13 |
| | Band phase | 292.5° | 315° | 337.5° | 360° | | | | | | | | | | | | | |
| Fourth pattern light of second brightness | Coordinate | P16 | P15 | P14 | | | | | | | | | | | | | | G14 |
| | Band phase | 315° | 337.5° | 360° | | | | | | | | | | | | | | |
| Fourth pattern light of third brightness | Coordinate | P16 | P15 | | | | | | | | | | | | | | | G15 |
| | Band phase | 337.5° | 360° | | | | | | | | | | | | | | | |
| Fourth pattern light of fourth brightness | Coordinate | P16 | | | | | | | | | | | | | | | | G16 |
| | Band phase | 360° | | | | | | | | | | | | | | | | |

FIG. 7

| | | P31 | P30 | P29 | P28 | P27 | P26 | P25 | P24 | P23 | P22 | P21 | P20 | P19 | P18 | P17 | P16 | P15 | P14 | P13 | P12 |
|---|---|---|---|---|---|---|---|---|---|---|---|---|---|---|---|---|---|---|---|---|---|
| First group data | 1st time ($\theta+0°$) | | | | | | | | | | | | | | ⋮ | G1 (0°) | ⋮ | | | | |
| | 2nd time ($\theta+90°$) | | | | | | | | | | | | | | ⋮ | G5 (90°) | ⋮ | | | | |
| | 3rd time ($\theta+180°$) | | | | | | | | | | | | | | ⋮ | G9 (180°) | ⋮ | | | | |
| | 4th time ($\theta+270°$) | | | | | | | | | | | | | | ⋮ | G13 (270°) | ⋮ | | | | |
| Second group data | 1st time ($\theta+0°$) | | | | | | | | | | | | | | ⋮ | G2 (22.5°) | ⋮ | | | | |
| | 2nd time ($\theta+90°$) | | | | | | | | | | | | | | ⋮ | G6 (112.5°) | ⋮ | | | | |
| | 3rd time ($\theta+180°$) | | | | | | | | | | | | | | ⋮ | G10 (202.5°) | ⋮ | | | | |
| | 4th time ($\theta+270°$) | | | | | | | | | | | | | | ⋮ | G14 (292.5°) | ⋮ | | | | |
| Third group data | 1st time ($\theta+0°$) | | | | | | | | | | | | | | ⋮ | G3 (45°) | ⋮ | | | | |
| | 2nd time ($\theta+90°$) | | | | | | | | | | | | | | ⋮ | G7 (135°) | ⋮ | | | | |
| | 3rd time ($\theta+180°$) | | | | | | | | | | | | | | ⋮ | G11 (225°) | ⋮ | | | | |
| | 4th time ($\theta+270°$) | | | | | | | | | | | | | | ⋮ | G15 (315°) | ⋮ | | | | |
| Fourth group data | 1st time ($\theta+0°$) | | | | | | | | | | | | | | ⋮ | G4 (67.5°) | ⋮ | | | | |
| | 2nd time ($\theta+90°$) | | | | | | | | | | | | | | ⋮ | G8 (157.5°) | ⋮ | | | | |
| | 3rd time ($\theta+180°$) | | | | | | | | | | | | | | ⋮ | G12 (247.5°) | ⋮ | | | | |
| | 4th time ($\theta+270°$) | | | | | | | | | | | | | | ⋮ | G16 (337.5°) | ⋮ | | | | |

FIG. 8

|  | Irradiation brightness | Initial phase | Shift amount from the initial phase | | | | Effective brightness | | Effective determination |
|---|---|---|---|---|---|---|---|---|---|
|  |  |  | 0° | 90° | 180° | 270° | Min. | Max. |  |
| First group data | 50 | 0 | 55 | 105 | 55 | 5 | 11 | 254 | × |
| Second group data | 100 | 22.5 | 148 | 202 | 72 | 18 | 11 | 254 | ○ |
| Third group data | 200 | 45 | 255 | 255 | 79 | 79 | 11 | 254 | × |
| Fourth group data | 400 | 67.5 | 255 | 255 | 70 | 287 | 11 | 254 | × |

FIG. 9

|  | Irradiation brightness | Initial phase | Shift amount from the initial phase | | | |
|---|---|---|---|---|---|---|
|  |  |  | 0° | 90° | 180° | 270° |
| First group data | 50 | 0 | 55 | 105 | 55 | 5 |
| Second group data | 100 | 22.5 | 148 | 202 | 72 | 18 |
| Third group data | 200 | 45 | 361 | 361 | 79 | 79 |
| Fourth group data | 400 | 67.5 | 810 | 593 | 70 | 287 |

THREE-DIMENSIONAL MEASURING DEVICE

CROSS-REFERENCE TO RELATED APPLICATIONS

This application is a continuation application of International Patent Application No. PCT/JP2012/061063 filed on Apr. 25, 2012, which claims priority to Japanese Patent Application No. 2012-014793 filed on Jan. 27, 2012 in Japan.

BACKGROUND OF INVENTION

1. Field of the Invention

The present invention relates to a three-dimensional measuring device.

2. Background Art

Generally, when mounting an electronic component on a printed substrate, a cream solder is first printed on a predetermined electrode pattern provided on the printed substrate. Next, the electronic component is temporarily fixed on the printed substrate based on a viscosity of the cream solder. Subsequently, the printed substrate is led to a reflow furnace, and soldering is performed by undergoing a predetermined reflow process. Recently, there is a need to inspect a printing condition of the cream solder in a step before being led to the reflow furnace, and a three-dimensional measuring device is sometimes used on an occasion of such inspection.

In recent years, various three-dimensional measuring devices of a so-called non-contact type that use light are proposed, and a technique relating to a three-dimensional measuring device using a phase shift method is proposed, for example.

In the three-dimensional measuring device using a phase shift method, a pattern light having a light intensity distribution in a sine wave shape (banded shape) is irradiated to an object to be measured (in this case, the printed substrate) by an irradiation means configured by a combination of a light source and a filter of a sine wave pattern. The object is then observed using an imaging means disposed directly above a point on the substrate. As the imaging means, a CCD camera or the like configured by a lens, an imaging element, and the like is used. In this case, an intensity I of a light of a point to be measured P on a screen is given in the formula below.

$$I = B + A \cdot \cos \phi$$

[B: direct current light noise (offset component), A: contrast of the sine wave (reflection rate), $\phi$: phase given by unevenness of the object]

At this time, the pattern light is moved; the phase is changed to, for example, four steps ($\phi+0$, $\phi+\pi/2$, $\phi+\pi$, $\phi+3\pi/2$); images having intensity distributions of I1, I2, I3, and I4 are incorporated; and a modulation amount (position information for deriving a height) θ is sought based on the formula described below.

$$\theta = \arctan\{(I4-I2)/(I1-I3)\}$$

This modulation amount θ is used to find a three-dimensional coordinate (X, Y, Z) of the point to be measured P of the cream solder or the like on the printed substrate, which coordinate is used to measure a three-dimensional shape of the object to be measured, especially a height thereof.

However, there is concern that acquiring more accurate data for each portion under a pattern light of the same brightness becomes difficult due to differing reflection rates of light and the like in the printed portion of the cream solder on the printed substrate (solder print region) and in other portions (background regions).

For example, concerning the solder print region that has a comparatively high reflection rate, there is concern that more accurate height measurement becomes difficult if the brightness of the pattern light is too high, causing a brightness saturation state (saturation) in pixels corresponding to the solder print region in the image data imaged by the imaging means. Meanwhile, concerning the background region that has a comparatively low reflection rate, there is concern that height measurement becomes difficult if the brightness of the pattern light is too low, thereby reducing a difference between light and dark (brightness difference) in the pattern light in the image data.

In contrast, in recent years, a technique for suitably performing height measurement by separately performing imaging under imaging conditions (irradiation brightness) suited to the solder print region and imaging under imaging conditions suited to the background region (See, e.g., Patent Document 1).

PATENT DOCUMENT

Patent Document 1: JPA No. 2006-300539

However, even within the same solder print region or background region, the reflection rate of the pattern light reflected on the printed substrate and incident to the camera differs at each position on the printed substrate due to, for example, a positional relationship between the camera and the printed substrate, a surface shape of the cream solder, or the like.

For example, when a predetermined surface shape of the cream solder is spherical or the like, portions with high and low reflection rates arise even within the same region corresponding to the cream solder. Because of this, when imaging under imaging conditions (irradiation brightness) suited to the portion with the high reflection rate, there is concern that measurement precision will drop because the portion with the low reflection rate becomes a dark image. Meanwhile, when imaging under imaging conditions suited to the portion with the low reflection rate, there is concern that the portion with the high reflection rate enters a brightness saturation state. As a result, there is concern that measurement precision will drop.

Note that the issues described above are not necessarily limited to when performing height measurement of the cream solder printed on the printed substrate or the like and are inherent to other fields of three-dimensional measuring devices. Further, these issues are not necessarily limited to the phase shift method.

SUMMARY OF INVENTION

Various embodiments of the present invention for addressing one or more of the above issues will be explained individually below. One or more embodiments of the present invention are directed to a three-dimensional measuring device that can attempt to improve measurement precision and the like in performing three-dimensional measurement. As may be required, the characteristic operational effects of the embodiments will also be described.

Embodiments 1

In one or more embodiments of the present invention, a three-dimensional measuring device is provided with: an irradiation unit that has a light intensity distribution in a banded shape along a transport direction of an object to be measured and that can switch between and irradiate a plurality of types of pattern lights with differing brightness to the continuously transported object to be measured; an imaging unit that images a reflected light from the object to be measured irradiated with the various types of pattern lights and that outputs an image data including at least a brightness value; an image data acquisition unit that, each time the object to be measured is transported a predetermined amount, configures as one set image data in a plurality of ways imaged under the pattern light of the same brightness, a phase thereof changed a predetermined amount at a time, and that acquires a plurality of image data sets imaged under the plurality of types of pattern lights; a determination unit that determines whether or not a brightness value of each pixel in the image data corresponding to each coordinate position on the object to be measured is included within a predetermined effective range; an extraction unit that extracts an image data set with the brightness value of each of the pixels in the image data within the effective range from among the plurality of image data sets at each of the coordinate positions of the object to be measured; and a three-dimensional measurement unit that performs three-dimensional measurement relating to each of the coordinate positions of the object to be measured based on the extracted image data set.

According to the above Embodiments 1 described above, the pattern light having the light intensity distribution in the banded shape is irradiated to the continuously transported object to be measured, and the object to be measured irradiated with the pattern light is imaged by the imaging unit each time the object to be measured is transported the predetermined amount (e.g., a distance corresponding to $\pi/2$ of the phase of the pattern light). By this, the image data of the plurality of ways (e.g., four ways), each with the phase of the irradiated pattern light differing a predetermined amount (e.g., $\pi/2$ at a time), is acquired. The three-dimensional measurement of the object to be measured is then performed based on these image data.

Moreover, in the above Embodiments 1, the plurality of sets of the image data sets configured from the image data of the plurality of ways under the plurality of types of the pattern lights of differing brightness is acquired. Then, along with determining whether or not the brightness value of each of the pixels in the image data corresponding to each of the coordinate positions (measurement points) on the object to be measured is included within the predetermined effective range, the image data set with the brightness value of each of the pixels in the image data within the effective range is extracted from among the plurality of image data sets, and the three-dimensional measurement relating to each of the coordinate positions of the object to be measured is performed by, for example, a phase shift method based on the extracted image data sets.

As a result, for each of the coordinate positions of the object to be measured, three dimensional measurement can be performed using image data of a more suitable brightness, and improving measurement precision can be attempted.

Embodiments 2

In one or more embodiments of the present invention, in the three-dimensional measuring device according to the Embodiments 1, the determination unit at least determines whether or not the brightness value of each of the pixels of the image data is smaller than a value corresponding to a saturation level.

According to the above Embodiments 2 described above, setting a value that is smaller than the value that corresponds to the saturation level as the upper limit of the effective range enables suppressing reduction of measurement precision caused by the brightness saturation.

Embodiments 3

In one or more embodiments of the present invention, in the three-dimensional measuring device according to either the Embodiments 1 or 2, the extraction unit extracts the image data set imaged under the pattern light with the highest irradiation brightness among the plurality of types of the pattern lights when there is a plurality of sets of the image data sets with the brightness value of each of the pixels in the image data within the effective range (the image data set smaller than the value corresponding to the saturation level) from among the plurality of the image data sets.

According to the above Embodiments 3 described above, the image data having the greater brightness value can be extracted, and more suitable three-dimensional measurement can be performed.

Embodiments 4

In one or more embodiments of the present invention, the three-dimensional measurement device according to either the Embodiments 1 or 2, is further provided with an average value calculation unit that calculates an average value of the plurality of sets of the image data sets when there is a plurality of sets of the image data sets extracted by the extraction unit, and the three-dimensional measurement unit performs the three-dimensional measurement based on the average value of the image data sets calculated by the average value calculation unit.

According to the Embodiments 4 described above, the image data that can perform more suitable three-dimensional measurement can be extracted.

Embodiments 5

In one or more embodiments of the present invention, in the three-dimensional measuring device according to any of the Embodiments 1 to 4, a value greater than a lower limit value (e.g., "0") obtainable by the brightness value of each of the pixels of the image data is set as the lower limit value of the effective range.

According to the Embodiments 5 described above, the image data having sufficient brightness for performing more suitable three-dimensional measurement can be extracted.

Embodiments 6

In one or more embodiments of the present invention, the three-dimensional measuring device according to any of the Embodiments 1 to 5, is further provided with an alignment unit that aligns a coordinate system between the image data imaged at respectively different positions in the transport direction of the object to be measured.

According to the Embodiments 6 described above, improvement of measuring efficiency and the like can be attempted because each image data can be acquired without stopping transport of the object to be measured.

Other aspects and advantages of the invention will be apparent from the following description and the appended claims.

BRIEF DESCRIPTION OF DRAWINGS

FIGS. 5A, 5B, and 5C are correspondence tables for describing types of pattern lights that change as time elapses (irradiation brightness) and phases of the pattern lights in each coordinate position of the printed substrate.

FIGS. 6A and 6B are charts schematically illustrating a state where a plurality of coordinate positions of image data is aligned.

FIG. 7 is a chart schematically illustrating a state where each data relating to each coordinate position of the printed substrate is organized and sorted according to predetermined groups.

FIG. 8 is a chart illustrating a specific example of a sixteen-way data (brightness value) relating to predetermined coordinate positions of the printed substrate.

FIG. 9 is a chart illustrating theoretical numerical values for describing a brightness saturation state in comparison with the data of FIG. 8.

DETAILED DESCRIPTION

One or more embodiments of the present invention will be explained below while referring to figures.

First, a configuration of a printed substrate as an object to be measured will be described in detail.

Figure 2:
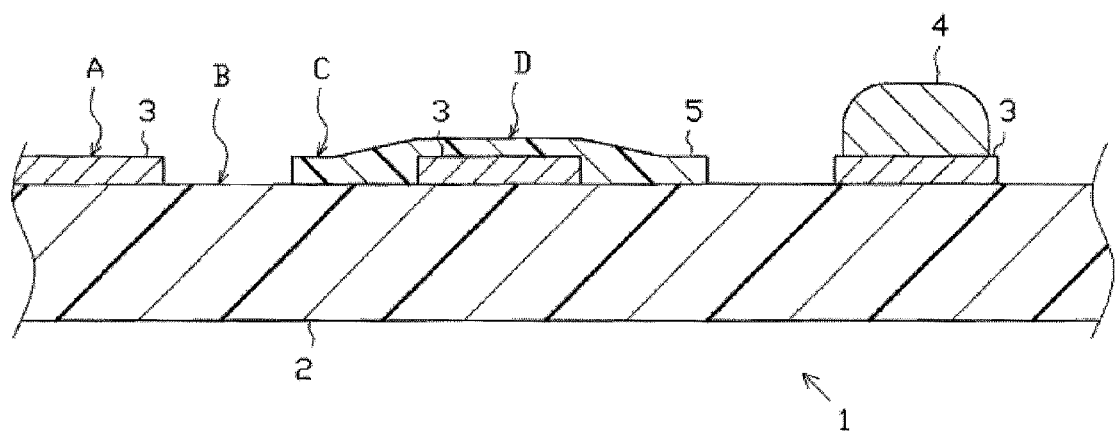
FIG. 2 is a cross-sectional view of a printed substrate.

As illustrated in FIG. 2, a printed substrate 1 is tabular and has an electrode pattern 3 configured from copper foil provided on a base substrate 2 configured from glass epoxy resin or the like. Moreover, a cream solder 4 is printed and formed on the predetermined electrode pattern 3. This region on which the cream solder 4 is printed will be called a "solder print region." Portions other than the solder print region will collectively be called a "background region," but this background region includes a region where the electrode pattern 3 is exposed (symbol A), a region where the base substrate 2 is exposed (symbol B), a region where a resist film 5 is coated on the base substrate 2 (symbol C), and a region where the resist film 5 is coated on the electrode pattern 3 (symbol D). Note that the resist film 5 is coated on a surface of the printed substrate 1 so the cream solder 4 is not applied thereon except on predetermined wiring portions.

Figure 1:
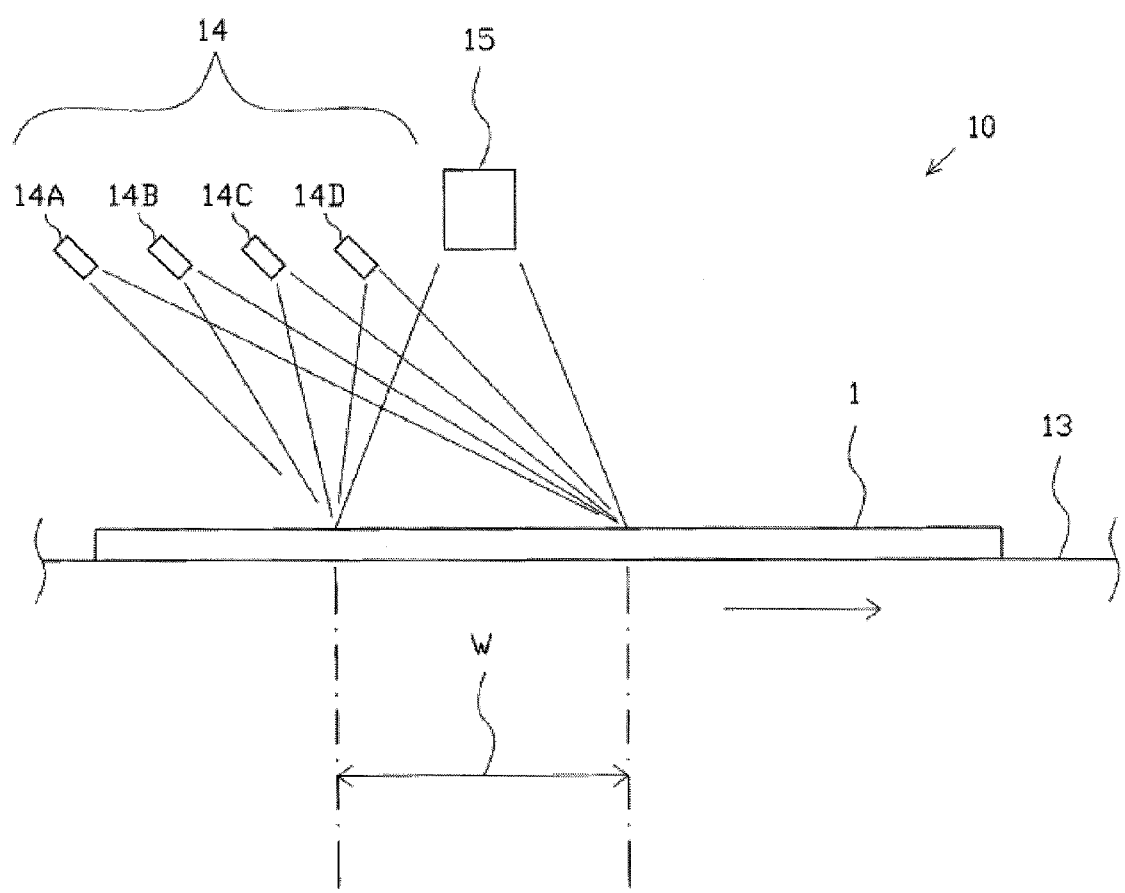
FIG. 1 is a schematic perspective view that schematically illustrates a substrate inspection device according to one or more embodiments of the present invention.

Next, a configuration of a substrate inspection device provided with the three-dimensional measuring device according to the present invention will be described in detail. FIG. 1 is a schematic configuration diagram schematically illustrating a substrate inspection device 10.

Figure 3:
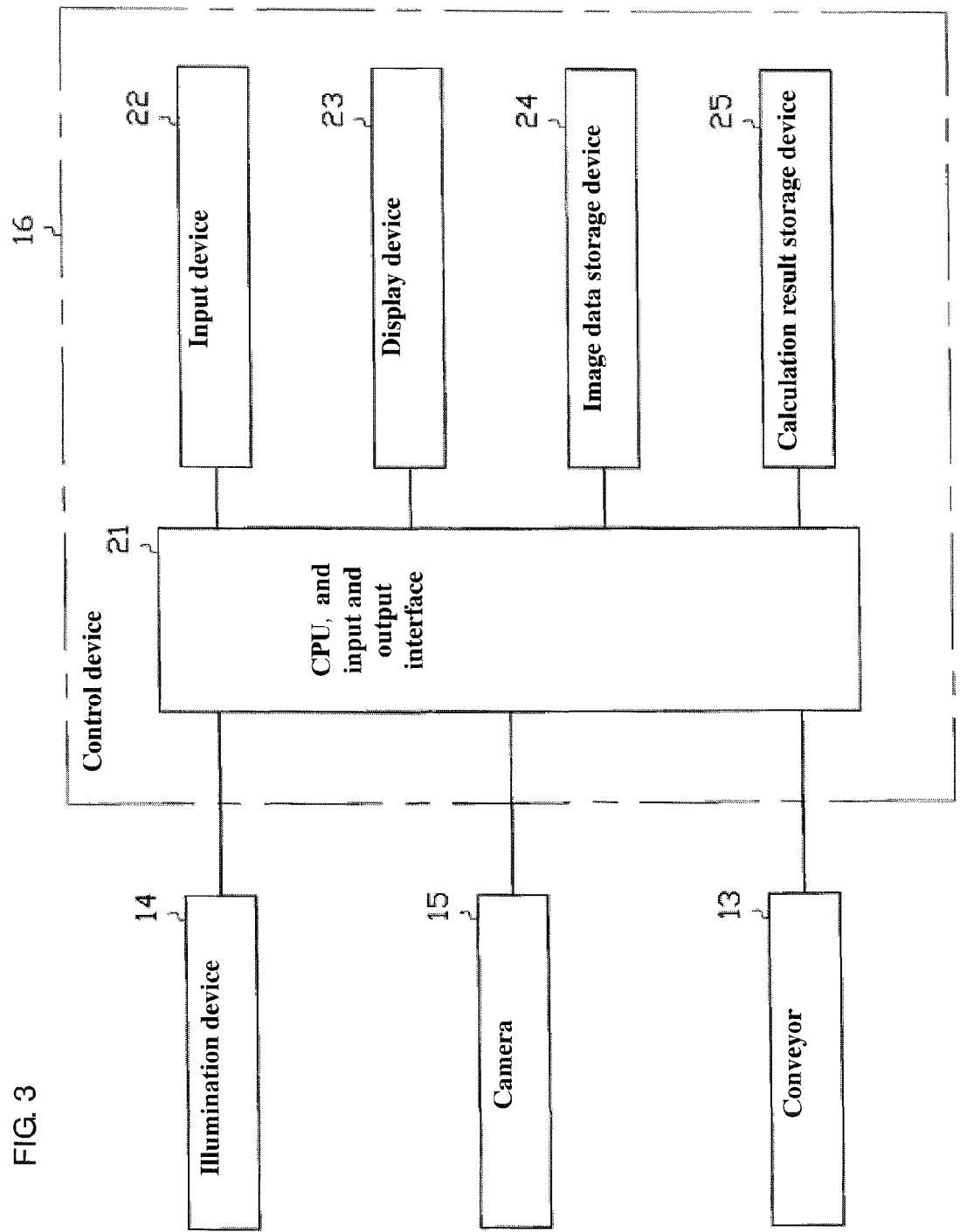
FIG. 3 is a block diagram illustrating a summary of the substrate inspection device.

The substrate inspection device 10 is provided with a conveyor 13 as a transport unit that transports the printed substrate 1, an illumination device 14 as an irradiation unit that irradiates a predetermined light from diagonally above relative to the surface of the printed substrate 1, a camera 15 as an imaging unit that images a reflected light from the printed substrate 1 irradiated with light, and a control device 16 for carrying out various controls, image processing, and calculation processing within the substrate inspection device 10 (See FIG. 3).

A motor that is not illustrated is provided to the conveyor 13, and the printed substrate 1 mounted on the conveyor 13 is continuously transported at a constant speed in a predetermined direction (rightward in FIG. 1) by the control device 16 drive-controlling the motor. By this, an imaging range W of the camera 15 is made to move relatively in a reverse direction relative to the printed substrate 1 (leftward in FIG. 1).

The illumination device 14 is provided with four illuminations (light sources) that emit a predetermined light. Specifically, a first illumination 14A to a fourth illumination 14D are provided.

The first illumination 14A to the fourth illumination 14D are respectively provided with a known liquid crystal optical shutter and are configured to be able to irradiate a pattern light having a light intensity distribution in a banded shape (sine wave shape) along the transport direction relative to the printed substrate 1. That is, a pattern light is irradiated where a direction of the banding is orthogonal to the transport direction of the printed substrate.

However, the pattern lights irradiated from the first illumination 14A to the fourth illumination 14D each have a different irradiation brightness.

More specifically, a pattern light of a first brightness is irradiated from the first illumination 14A. A pattern light of a second brightness that is two times the first brightness is irradiated from the second illumination 14B. A pattern light of a third brightness that is two times the second brightness is irradiated from the third illumination 14C. A pattern light of a fourth brightness that is two times the third brightness is irradiated from the fourth illumination 14D.

In the present embodiment, the first brightness is set to "50 $(cd/m^2)$," the second brightness to "100 $(cd/m^2)$," the third brightness to "200 $(cd/m^2)$," and the fourth brightness to "400 $(cd/m^2)$," for example.

Moreover, a monochrome CCD camera with 256 levels using a CCD sensor as an imaging element is used in the camera 15 according to the present embodiment. That is, an image imaged by the camera 15, upon being converted to a digital signal inside the camera 15, is input to the control device 16 as image data including a brightness value of one value from "0" to "255" for at least each pixel. The control device 16 then carries out an image process, a three-dimensional measurement process, an inspection process, or the like as described below based on the image data.

Next, an electrical configuration of the control device 16 will be described in detail with reference to FIG. 3. FIG. 3 is a block diagram illustrating a summary of the substrate inspection device 10.

As illustrated in FIG. 3, the control device 16 is provided with a CPU and an input and output interface 21 that govern overall control of the substrate inspection device 10; an input device 22 as an input unit configured from a keyboard, a mouse, or a touch panel; a display device 23 as a display unit that has a display screen of CRT, liquid crystal, or the like; an image data storage device 24 for storing the image data imaged by the camera 15; a calculation result storage device 25 for storing various types of calculation results such as three-dimensional measurement results obtained based on the image data; and the like. Note that each of these devices 22 to 25 are electrically connected to the CPU and the input and output interface 21.

Next, various processes of the three-dimensional measurement process and the like executed in the substrate inspection device 10 will be described in detail.

The control device 16 drive-controls the conveyor 13 and continuously transports the printed substrate 1 at a constant speed. The control device 16 then drive-controls the illumination device 14 and the camera 15 based on signals from an encoder, which is not illustrated, provided to the conveyor 13.

More specifically, each time the printed substrate 1 is transported a predetermined amount Δx, that is, each time a predetermined time Δt elapses, the light irradiated from the illumination device 14 in a predetermined sequence is switched, and the printed substrate irradiated with light is imaged by the camera 15. In the present embodiment, the predetermined amount Δx is set to a distance corresponding to π/8th)(22.5° of a phase of the pattern light irradiated from the illumination device 14 (the first illumination 14A to the fourth illumination 14D). Moreover, the imaging range W of the camera 15 is set to a length corresponding to 2π (360°) of the phase of the pattern light.

Figure 4:
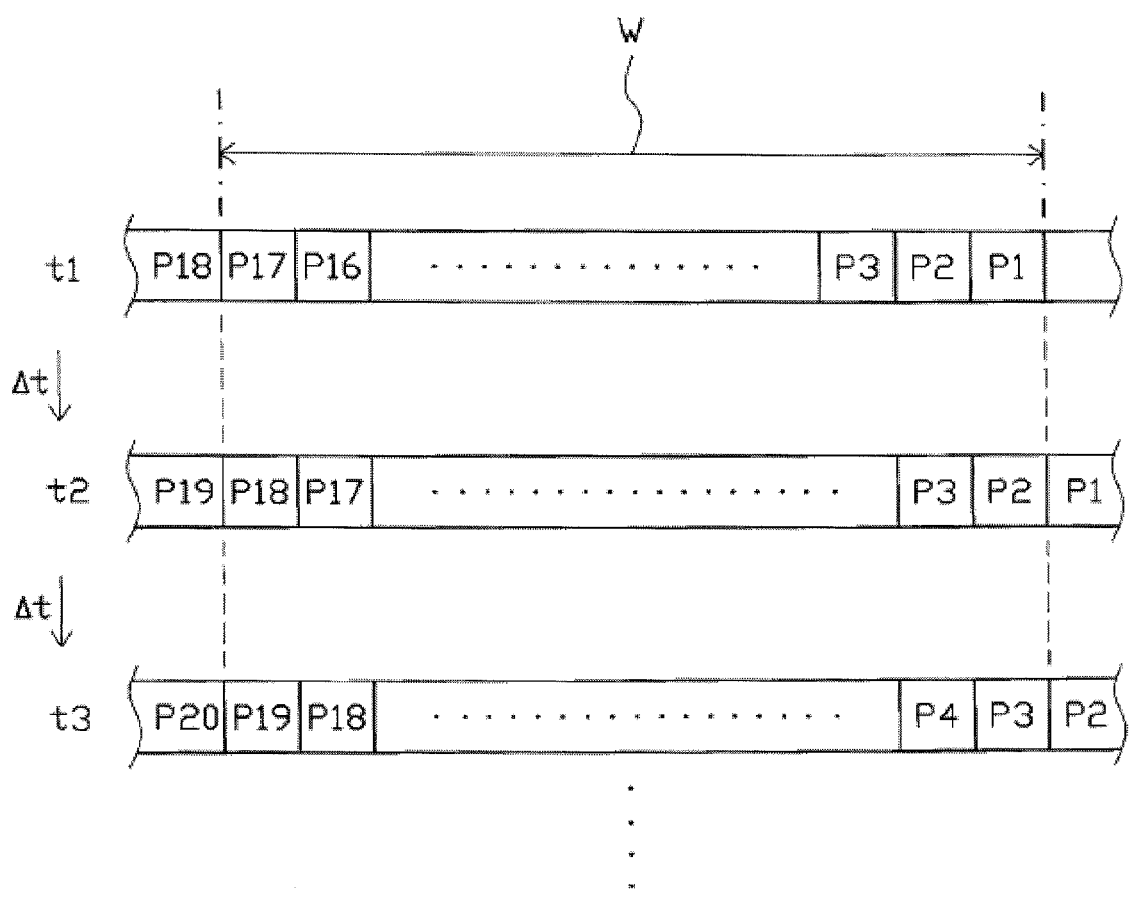
FIG. 4 is a schematic diagram for describing a relationship between an imaging range of a camera that changes as time elapses and a coordinate position of the printed substrate.

Here, a relationship between the light irradiated from the illumination device 14 and the imaging range W of the camera 15 is described in detail giving specific examples. FIG. 4 is a schematic diagram for describing the relationship between the imaging range W of the camera 15 that moves relatively as time elapses and the coordinate position of the printed substrate 1. FIGS. 5A, 5B, and 5C are correspondence tables for describing types of pattern lights that change as time elapses (irradiation brightness) and phases of the pattern lights in each coordinate position of the printed substrate 1.

As illustrated in FIGS. 4 and 5, the pattern light of the first brightness is irradiated from the first illumination 14A to the printed substrate 1 at a predetermined imaging timing t1. At this time, within the imaging range W of the camera 15, a range corresponding to coordinates P1 to P17 in the transport direction thereof (X direction) is positioned in the printed substrate 1. That is, an image data G1 in the range of the coordinates P1 to P17 on the surface of the printed substrate 1 irradiated with the pattern light of the first brightness is acquired at the imaging timing t1. Note that, concerning the direction orthogonal to the transport direction (Y direction), the entire Y direction range of the printed substrate 1 is included within the imaging range of the camera 15 and that, concerning each coordinate position in the Y direction in the same coordinate position in the X direction, there is no difference in the type or phase of the pattern light (same below).

As illustrated in FIGS. 5A, 5B, and 5C, at the imaging timing t1, image data is acquired where the phase of the pattern light is displaced by "22.5°" at each coordinate P1 to P17. For example, the phase of the pattern light irradiated to the printed substrate 1 is "0°" at the coordinate P17, "22.5°" at the coordinate P16, "45°" at the coordinate P15, . . . , and "360°" at the coordinate P1.

The pattern light of the second brightness is irradiated from the second illumination 14B to the printed substrate 1 at an imaging timing t2, when a predetermined time Δt has elapsed from the imaging timing t1. At this time, a range corresponding to coordinates P2 to P18 of the printed substrate 1 is positioned within the imaging range W of the camera 15, and an image data G2 of the range is acquired.

The pattern light of the third brightness is irradiated from the third illumination 14C to the printed substrate 1 at an imaging timing t3, when a predetermined time Δt has elapsed from the imaging timing t2. At this time, a range corresponding to coordinates P3 to P19 of the printed substrate 1 is positioned within the imaging range W of the camera 15, and an image data G3 of the range is acquired.

The pattern light of the fourth brightness is irradiated from the fourth illumination 14D to the printed substrate 1 at an imaging timing t4, when a predetermined time Δt has elapsed from the imaging timing t3. At this time, a range corresponding to coordinates P4 to P20 of the printed substrate 1 is positioned within the imaging range W of the camera 15, and an image data G4 of the range is acquired.

The pattern light of the first brightness is irradiated from the first illumination 14A to the printed substrate 1 at an imaging timing t5, when a predetermined time Δt has elapsed from the imaging timing t4. At this time, a range corresponding to coordinates P5 to P21 of the printed substrate 1 is positioned within the imaging range W of the camera 15, and an image data G5 of the range is acquired.

The pattern light of the second brightness is irradiated from the second illumination 14B to the printed substrate 1 at an imaging timing t6, when a predetermined time Δt has elapsed from the imaging timing t5. At this time, a range corresponding to coordinates P6 to P22 of the printed substrate 1 is positioned within the imaging range W of the camera 15, and an image data G6 of the range is acquired.

The pattern light of the third brightness is irradiated from the third illumination 14C to the printed substrate 1 at an imaging timing t7, when a predetermined time Δt has elapsed from the imaging timing t6. At this time, a range corresponding to coordinates P7 to P23 of the printed substrate 1 is positioned within the imaging range W of the camera 15, and an image data G7 of the range is acquired.

The pattern light of the fourth brightness is irradiated from the fourth illumination 14D to the printed substrate 1 at an imaging timing t8, when a predetermined time Δt has elapsed from the imaging timing t7. At this time, a range corresponding to coordinates P8 to P24 of the printed substrate 1 is positioned within the imaging range W of the camera 15, and an image data G8 of the range is acquired.

The pattern light of the first brightness is irradiated from the first illumination 14A to the printed substrate 1 at an imaging timing t9, when a predetermined time Δt has elapsed from the imaging timing t8. At this time, a range corresponding to coordinates P9 to P25 of the printed substrate 1 is positioned within the imaging range W of the camera 15, and an image data G9 of the range is acquired.

The pattern light of the second brightness is irradiated from the second illumination 14B to the printed substrate 1 at an imaging timing t10, when a predetermined time Δt has elapsed from the imaging timing t9. At this time, a range corresponding to coordinates P10 to P26 of the printed substrate 1 is positioned within the imaging range W of the camera 15, and an image data G10 of the range is acquired.

The pattern light of the third brightness is irradiated from the third illumination 14C to the printed substrate 1 at an imaging timing t11, when a predetermined time Δt has elapsed from the imaging timing t10. At this time, a range corresponding to coordinates P11 to P27 of the printed substrate 1 is positioned within the imaging range W of the camera 15, and an image data G11 of the range is acquired.

The pattern light of the fourth brightness is irradiated from the fourth illumination 14D to the printed substrate 1 at an imaging timing t12, when a predetermined time Δt has elapsed from the imaging timing t11. At this time, a range corresponding to coordinates P12 to P28 of the printed substrate 1 is positioned within the imaging range W of the camera 15, and an image data G12 of the range is acquired.

The pattern light of the first brightness is irradiated from the first illumination 14A to the printed substrate 1 at an imaging timing t13, when a predetermined time Δt has elapsed from the imaging timing t12. At this time, a range corresponding to coordinates P13 to P29 of the printed substrate 1 is positioned within the imaging range W of the camera 15, and an image data G13 of the range is acquired.

The pattern light of the second brightness is irradiated from the second illumination 14B to the printed substrate 1 at an imaging timing t14, when a predetermined time Δt has elapsed from the imaging timing t13. At this time, a range corresponding to coordinates P14 to P30 of the printed substrate 1 is positioned within the imaging range W of the camera 15, and an image data G14 of the range is acquired.

The pattern light of the third brightness is irradiated from the third illumination 14C to the printed substrate 1 at an imaging timing t15, when a predetermined time Δt has elapsed from the imaging timing t14. At this time, a range corresponding to coordinates P15 to P31 of the printed substrate 1 is positioned within the imaging range W of the camera 15, and an image data G15 of the range is obtained.

The pattern light of the fourth brightness is irradiated from the fourth illumination 14D to the printed substrate 1 at an imaging timing t16, when a predetermined time Δt has elapsed from the imaging timing t15. At this time, a range corresponding to coordinates P16 to P32 of the printed substrate 1 is positioned within the imaging range W of the camera 15, and an image data G16 of the range is acquired.

The same process as the process at the imaging timing t1 described above is again performed when a predetermined time Δt has elapsed from the imaging timing t16. Hereafter, the same processes as the processes at the imaging timings t1 to t16 described above are repeatedly performed.

When all of the data relating to the predetermined coordinate positions of the printed substrate 1 are obtained in this manner, an alignment process that aligns the coordinate positions of each image data G1 to G16 described above is executed (See FIGS. 6A and 6B). A function that executes this process configures the alignment unit according to the present embodiment. FIGS. 6A and 6B are charts schematically illustrating a state where a plurality of coordinate positions of the image data G1 to G16 acquired at the imaging timings t1 to t16 is aligned.

Next, each data relating to the same coordinate positions of the plurality of image data G1 to G16 are summarized according to each coordinate position, organized according to predetermined groups, and stored in the calculation result storage device 25 (See FIG. 7). FIG. 7 is a chart schematically illustrating a state where each data relating to each coordinate position of the printed substrate 1 illustrated in FIGS. 6A and 6B are organized and sorted according to predetermined groups. However, in FIG. 7, only a portion relating to the coordinate P17 is illustrated.

In the present embodiment, the coordinate positions of the printed substrate 1 are divided and stored as a first group data configured from a four-way data (image data G1, G5, G9, G13) imaged under the pattern light of the first brightness with the phase of the pattern light shifted 90° at a time, a second group data configured from a four-way data (image data G2, G6, G10, G14) imaged under the pattern light of the second brightness with the phase of the pattern light shifted 90° at a time, a third group data configured from a four-way data (image data G3, G7, G11, G15) imaged under the pattern light of the third brightness with the phase of the pattern light shifted 90° at a time, and a fourth group data configured from a four-way data (image data G4, G8, G12, G16) imaged under the pattern light of the fourth brightness with the phase of the pattern light shifter 90° at a time. Here, each group data corresponds respectively to an image data set in the present embodiment, and a processing function that acquires these configures an image data acquisition unit.

Here, a specific example of the sixteen-way data (brightness value) relating to the predetermined coordinate positions in the solder print region is illustrated in FIG. 8. In the example illustrated in FIG. 8, of the third and fourth group data, the brightness values of locations corresponding to shift amounts in the pattern light of "0°" and "90°" from an initial phase is made to be "255," which corresponds to the saturation level (See the shaded portion).

However, concerning the location described above where the brightness value is the saturation level "255," that is, in the brightness saturation state, there is also a possibility that the brightness level of the light actually incident to the camera 15 and the brightness value stored as the image data are not proportional. For example, as illustrated in FIG. 9, there is a possibility that the brightness level of the incident light is at or greater than a level that corresponds to the brightness value "255." Note that the value relating to the above location illustrated in FIG. 9 is a theoretical numerical value that replaces the brightness level of the incident light with a value corresponding to data with 256 levels of another portion.

Next, for each coordinate position of the printed substrate 1, it is determined whether or not the values of the brightness values included in the four groups of four-way data described above (in total the sixteen-way image data G1 to G16) are respectively included within a predetermined effective region H. A function that executes this determination process configures a determination unit according to the present embodiment.

In the present embodiment, it is determined whether or not the brightness value is included in a range of "11" or greater and "254" or less (See FIG. 8).

Next, at each coordinate position of the printed substrate 1, the group data with the brightness value of each pixel in the image data G1 to G16 within the effective range H (11≤H≤254) described above is extracted from among the four group data. By this, the group data including the image data in the brightness saturation state is removed from the data on which three-dimensional measurement is based. A function that executes this extraction process configures an extraction unit according to the present embodiment.

In the example illustrated in FIG. 8, the second group data imaged under the pattern light of the second brightness is extracted. Note that if there is a plurality of group data with the brightness value of each pixel in the image data within the effective range H (including when all four group data satisfy this condition), the group data imaged under the pattern light with the highest irradiation brightness among the pattern lights of a plurality of types as described above is extracted. For example, if all of the group data satisfy the condition described above, the fourth group data imaged under the pattern light of the fourth brightness is extracted.

Next, the control device 16, based on the group data extracted as described above, performs height measurement for each coordinate by the known phase shift method also illustrated in the Background Art. Then, by repeating the process for each coordinate, the overall height data of the printed substrate 1 is calculated and stored as three-dimensional data of the printed substrate 1 in the calculation result storage device 25. This processing function configures a three-dimensional measurement unit according to the present embodiment.

Based on the measurement result obtained as described above, quality determination of the print state of the cream solder 4 is then performed. Specifically, the print range of the cream solder 4 that increased in height by a predetermined length or more beyond a height standard surface is detected, and a volume of a portion within this range is calculated. Then, the volume is comparatively determined with a predetermined standard value, and the quality of the print state of the cream solder 4 is determined by whether or not this comparison result is within an allowed range.

As described in detail above, in the present embodiment, the pattern light having the banded light intensity distribution is irradiated to the continuously transported printed substrate 1, and the printed substrate 1 irradiated with the pattern light is imaged by the camera 15 each time the printed substrate 1 is transported a predetermined amount. By this, the four-way image data with the phase of the irradiated pattern light differing $\pi/2$ at a time is acquired. The three-dimensional measurement of the printed substrate 1 is then performed based on these image data.

Moreover, in the present embodiment, a plurality of sets of the group data configured from the four-way image data under four different types of pattern lights of differing brightness is acquired. Then, along with determining whether or not the brightness value of each pixel in the image data corresponding to each coordinate position on the printed substrate 1 is included within the predetermined effective range H, the group data with the brightness value of each pixel in the image data within the effective range H is extracted from among the four group data, and the three-dimensional measurement relating to each coordinate position of the printed substrate 1 is performed by the phase shift method based on the extracted group data.

As a result, for each coordinate position of the printed substrate 1, three dimensional measurement can be performed using image data of a more suitable brightness, and improving measurement precision can be attempted.

Note that the present invention is not limited to the contents described in the embodiments described above and may be implemented, for example, as follows. Additionally, other application examples and modified examples not illustrated below are also possible.

(a) In the embodiments described above, the three-dimensional measuring device is embodied as the substrate inspection device 10 that measures the height of the cream solder 4 printed and formed on the printed substrate 1. However, the present invention is not limited thereto. For example, the three-dimensional measuring device may be embodied in a configuration that measures a height of something else mounted on the substrate, such as an electronic component.

(b) The phase shift method of the embodiments described above is configured to change the phase of the patter light one-quarter pitch at a time. However, the present invention is not limited thereto, and the phase shift method may be configured to change the phase of the pattern light one-third pitch at a time.

(c) The configuration of the illumination device 14 is not limited to the embodiments described above. For example, the embodiment described above is of a configuration that provides four illuminations (light sources) with differing irradiation brightness. Instead of this configuration, however, a configuration may be used where one light source is provided and an irradiation brightness thereof is suitably changed and controlled.

Moreover, the irradiation brightness of each illumination 14A to 14D is not limited to the embodiments described above. For example, the first brightness may be set to "100 $(cd/m^2)$," the second brightness to "200 $(cd/m^2)$," the third brightness to "300 $(cd/m^2)$," the fourth brightness to "400 $(cd/m^2)$," and the like, differently from the embodiments described above.

(d) The configuration of the camera 15 is not limited to the embodiments described above. For example, a camera using a CMOS sensor as the imaging element or the like may be used. Moreover, the output levels of the camera 15 are also not limited to the 256 levels of the embodiment described above, and, for example, may be set to a different setting from the embodiment described above, such as 1024 levels.

(e) The embodiments described above are of the configuration that, when determining whether or not the brightness value of each pixel in the image data G1 to G16 corresponding to each coordinate position on the printed substrate 1 is included in the predetermined effective range H, determines whether or not an upper limit value is at or below "254," which is smaller than the value "255" that corresponds to the saturation level. The upper limit value is limited thereto and may be set to a different value.

Moreover, in the embodiments described above, a lower limit value of the effective range H is set as "11," which is a greater value than the lower limit value "0" able to be held as the brightness value of each pixel in the image data G1 to G16. However, the lower limit value is not limited thereto and may be set to a different value. Note that the lower limit may be of a configuration that does not set the lower limit value of the effective range H as "0," that is, that does not set a lower limit value, because failures of brightness saturation and the like of the upper limit do not occur.

(f) The embodiments described above are of the configuration that acquires four group data imaged under four different types of pattern lights of differing brightness when extracting the group data with the brightness value of each pixel in the image data G1 to G16 within the effective range H, but the number of group data is not limited thereto and is sufficient if two or more.

(g) The embodiments described above are of the configuration that extracts the group data imaged under the pattern light of the highest irradiation brightness among the four types of pattern lights when there is a plurality of group data with the brightness value of each pixel in the image data within the effective range H. The extraction method of the group data used in the three-dimensional measuring is not limited thereto and may use a different method.

For example, when there is a plurality of group data with the brightness value of each pixel in the image data within the effective range H, the extraction method may be of a configuration that calculates an average value of the plurality of group data and performs three-dimensional measurement based on the average value of the group data. Here, a processing function that calculates the average value of the group data configures an average value calculation unit according to the above embodiments.

(h) The embodiments described above use the phase shift method as the three-dimensional measurement method using the pattern light, but other types of three-dimensional measurement methods such as a spatial code method, a moire method, or a focus method may also be used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims

DESCRIPTION OF REFERENCE CHARACTERS

1 . . . Printed substrate
4 . . . Cream solder
10 . . . Substrate inspection device
13 . . . Conveyor
14 . . . Illumination device
15 . . . Camera
16 . . . Control device
P1 to P32 . . . Coordinates
G1 to G16 . . . Image data
H . . . Effective range
W . . . Imaging range.

What is claimed is:

1. A three-dimensional measuring device, comprising:

an irradiation unit that has a light intensity distribution in a banded shape along a transport direction of an object to be measured and that can switch between and irradiate a plurality of types of pattern lights with differing brightness to the continuously transported object to be measured;

an imaging unit that images a reflected light from the object to be measured irradiated with the various types of pattern lights and that outputs an image data including at least a brightness value; and a CPU that:

each time the object to be measured is transported a predetermined amount, configures as one set image data in a plurality of ways imaged under the pattern light of the same brightness, a phase thereof changed a predetermined amount at a time, and that acquires a plurality of image data sets imaged under the plurality of types of pattern lights, determines whether a brightness value of each pixel in the image data corresponding to each coordinate position on the object to be measured is included within a predetermined effective range, extracts an image data set with the brightness value of each of the pixels in the image data within the effective range from among the plurality of image data sets at each of the coordinate positions of the object to be measured, and performs three-dimensional measurement relating to each of the coordinate positions of the object to be measured based on the extracted image data set, wherein the CPU extracts the image data set imaged under the pattern light with the highest irradiation brightness among the plurality of types of the pattern lights when there is a plurality of sets of the image data sets with the brightness value of each of the pixels in the image data within the effective range from among the plurality of the image data sets.

2. A three-dimensional measuring device, comprising:

an irradiation unit that has a light intensity distribution in a banded shape along a transport direction of an object to be measured and that can switch between and irradiate a plurality of types of pattern lights with differing brightness to the continuously transported object to be measured;

an imaging unit that images a reflected light from the object to be measured irradiated with the various types of pattern lights and that outputs an image data including at least a brightness value; and a CPU that each time the object to be measured is transported a predetermined amount, configures as one set image data in a plurality of ways imaged under the pattern light of the same brightness, a phase thereof changed a predetermined amount at a time, and that acquires a plurality of image data sets imaged under the plurality of types of pattern lights, determines whether a brightness value of each pixel in the image data corresponding to each coordinate position on the object to be measured is included within a predetermined effective range, extracts an image data set with the brightness value of each of the pixels in the image data within the effective range from among the plurality of image data sets at each of the coordinate positions of the object to be measured, performs three-dimensional measurement relating to each of the coordinate positions of the object to be measured based on the extracted image data set, and calculates an average value of the plurality of sets of the image data sets when there is a plurality of sets of the extracted image data sets, wherein the CPU performs the three-dimensional measurement based on the calculated average value of the image data sets.

3. The three-dimensional measuring device according to claim 1, wherein the CPU at least determines whether the brightness value of each of the pixels of the image data is smaller than a value corresponding to a saturation level.

4. The three-dimensional measuring device according to claim 1, wherein a value greater than a lower limit value obtainable by the brightness value of each of the pixels of the image data is set as the lower limit value of the effective range.

5. The three-dimensional measuring device according to claim 1, wherein the CPU aligns a coordinate system between the image data imaged at respectively different positions in the transport direction of the object to be measured.

6. The three-dimensional measuring device according to claim 2, wherein the CPU at least determines whether the brightness value of each of the pixels of the image data is smaller than a value corresponding to a saturation level.

7. The three-dimensional measuring device according to claim 2, wherein a value greater than a lower limit value obtainable by the brightness value of each of the pixels of the image data is set as the lower limit value of the effective range.

8. The three-dimensional measuring device according to claim 3, wherein a value greater than a lower limit value obtainable by the brightness value of each of the pixels of the image data is set as the lower limit value of the effective range.

9. The three-dimensional measuring device according to claim 2, wherein the CPU aligns a coordinate system between the image data imaged at respectively different positions in the transport direction of the object to be measured.

10. The three-dimensional measuring device according to claim 3, wherein the CPU aligns a coordinate system between the image data imaged at respectively different positions in the transport direction of the object to be measured.

11. The three-dimensional measuring device according to claim 4, wherein the CPU aligns a coordinate system between the image data imaged at respectively different positions in the transport direction of the object to be measured.

* * * * *